United States Patent
Auberger et al.

(10) Patent No.: US 7,224,355 B2
(45) Date of Patent: May 29, 2007

(54) METHOD FOR POST-PROCESSING A 3D DIGITAL VIDEO SIGNAL

(75) Inventors: Stéphane Auberger, Paris (FR); Yann Picard, Paris (FR)

(73) Assignee: Koninklijke Philips Electronics N.V., Eindhoven (NL)

(*) Notice: Subject to any disclaimer, the term of this patent is extended or adjusted under 35 U.S.C. 154(b) by 108 days.

(21) Appl. No.: 10/531,935

(22) PCT Filed: Oct. 1, 2003

(86) PCT No.: PCT/IB03/04363

§ 371 (c)(1),
(2), (4) Date: Apr. 19, 2005

(87) PCT Pub. No.: WO2004/009084

PCT Pub. Date: May 6, 2005

(65) Prior Publication Data

US 2006/0082575 A1    Apr. 20, 2006

(30) Foreign Application Priority Data

Oct. 23, 2002 (EP) .................... 02292623

(51) Int. Cl.
*G06T 15/00* (2006.01)

(52) U.S. Cl. .................... 345/419; 382/204
(58) Field of Classification Search .......... None
See application file for complete search history.

(56) References Cited

U.S. PATENT DOCUMENTS

| | | | |
|---|---|---|---|
| 5,982,390 A * | 11/1999 | Stoneking et al. | 345/474 |
| 6,661,918 B1 * | 12/2003 | Gordon et al. | 382/173 |
| 6,714,665 B1 * | 3/2004 | Hanna et al. | 382/117 |
| 7,085,409 B2 * | 8/2006 | Sawhney et al. | 382/154 |
| 2002/0024516 A1 * | 2/2002 | Chen et al. | 345/419 |
| 2004/0240725 A1 * | 12/2004 | Xu et al. | 382/154 |

* cited by examiner

*Primary Examiner*—Mark Zimmerman
*Assistant Examiner*—Enrique L. Santiago

(57) ABSTRACT

The present invention relates to a method for post-processing a 3D digital video signal, said digital video signal having a plurality of views with associated disparity maps. The invention is characterized in that said method comprises a first step of generating a projected disparity map from an original disparity map, and a second step of filling holes within said projected disparity map, the first step comprising the sub-step of removing isolated projected pixels on said projected disparity map by filtering them.

12 Claims, 4 Drawing Sheets

METHOD FOR POST-PROCESSING A 3D DIGITAL VIDEO SIGNAL

FIELD OF THE INVENTION

The present invention relates to a method for post-processing a digital video signal, said digital video signal having a plurality of views with associated disparity maps.

Such a method may be used in, for example, a video communication system for 3D video applications within MPEG standards.

BACKGROUND OF THE INVENTION

Most representations of 3D video signals called 3D scenes rely on depth maps and disparity maps. Generally, one starts from a set of images of a given 3D scene, corresponding to different points of view, each of them possibly coming with different associated characteristics such as a depth map and a texture. The depth map of a point of view is a grayscale image, each pixel of which contains the distance to a camera filming the scene. When one wants to generate a new point of view, also called more simply view, of the scene, it is possible to compute some areas of it, given another point of view, its depth map, the intrinsic camera parameters and the parameters of the changes undergone by the camera going from this point of view to the new one (displacement, rotation, lens changes). This process is called "Reconstruction", the new point of view created being called a Reconstructed view (or reconstructed image). If a point P of the scene is visible from both points of view, a translation vector will give its pixel coordinate in the new point of view from its pixel coordinate in the original one. These vectors are called disparity vectors. Projective geometry results, as disclosed in the document "three dimensional computer vision—O. Faugeras MIT Press 1993", establish a simple relation between disparity vectors of the disparity map and depth values of the depth map.

During transmission of a video signal, multi-view or stereo coding schemes, well known to those skilled in the art, generally encode by compression the textures and the depth maps needed to cover a certain range of points of view. Whereas texture can be encoded by using standard methods, potentially leading to well-known artifacts in the case of lossy encoding, the case of depth (or disparity) encoding is a little more tricky: for an encoded depth map to have a visually similar aspect as the original one does not necessarily mean that it has the same reconstruction properties. In the new view generation process, points or areas could be translated to the wrong place (because of wrong disparity vectors). This would create texture discontinuities that may be more noticeable than what the "visual" aspect of the encoded map suggested. Still, dense depth maps are quite big files and lossy compression is almost unavoidable if one wants to keep depth maps size within a reasonable range (namely less than 20% of texture bit-rate). One therefore has to deal with artifacts and improper depth/disparity values and one must design post-processing after the decoding of the video signal and enhancement algorithms.

Within the MPEG-4 standard, depth map can be encoded using the Multiple Auxiliary Component tools (MAC) (as described in <<*Amendment 1: Visual extensions*, ISO/IEC JTC 1/SC 29/WG 11 N 3056, December 1999>>), in which they are DCT encoded on a block basis, similarly to a classic luminance image encoding well known to those skilled in the art. No specific treatments of the underlying artifacts are proposed but traditional MPEG tools that, as previously stated, are good for texture but not necessarily for depth maps. Hence, for example, in the texture reconstructed image, this can lead to a fuzzy edge along with isolated texture pixels, two effects that, moreover, are time-inconsistent in the course of following points of view.

OBJECT AND SUMMARY OF THE INVENTION

Accordingly, it is an object of the invention to provide a method for post-processing a digital video signal, said digital video signal having a plurality of views with associated disparity maps, which method corrects depth map (or disparity map) coding artifacts.

To this end, there is provided a method as defined in claim 1.

As we will see in detail, by removing the isolated projected pixels, the incoherent values of the projected and original disparity maps are eliminated.

An embodiment of the method according to the invention comprises the steps defined in claim 2.

A further embodiment of the method according to the invention comprises the steps defined in claim 3.

A further embodiment of the method according to the invention comprises the steps defined in claim 4.

A further embodiment of the method according to the invention comprises the steps defined in claim 5.

A further embodiment of the method according to the invention comprises the steps defined in claim 6.

By taking into account the surrounding projected pixels of hole boundaries, it has the advantage of avoiding padding said hole with erroneous values coming from erroneous hole boundary values due to compression.

A further embodiment of the method according to the invention comprises the steps defined in claim 7.

This has the advantage of avoiding an interpolation for undefined values inconsistent in space.

BRIEF DESCRIPTION OF THE DRAWINGS

Additional objects, features and advantages of the invention will become apparent upon reading the following detailed description and upon reference to the accompanying drawings in which.

Corresponding reference numerals will be used throughout the description for corresponding elements.

DETAILED DESCRIPTION OF THE INVENTION

Figure 1:
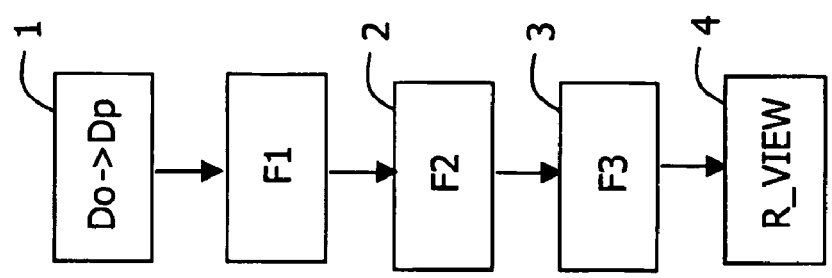
FIG. 1 is a schematic diagram of the method for post-processing a video signal according to the invention.

In the following description, functions or constructions well-known to the person skilled in the art are not described in detail as they would obscure the invention in unnecessary detail.

The present invention relates to a method for post-processing a digital video signal.

Such a method may be used within a video communication system for 3D video applications in MPEG4.

A 3D video signal comprises a plurality of points of view with different associated characteristics such as shape, texture, motion vectors, disparity map, depth map, colors, etc.

When a video signal is transmitted, it is encoded. During the encoding process, its different characteristics are encoded and especially the disparity and depth maps with a compression algorithm. This compression may lead to impaired disparity and depth maps with artifacts.

After transmission of the video signal, it is decoded, and then all its views are reconstructed during an algorithm that includes the post-processing of the decoded disparity. When one wants to generate a new point of view of the scene, it is possible to compute some areas of it, given another point of view, its depth map, the intrinsic camera parameters and the parameters of the changes undergone by the camera going from this point of view to the new one (displacement, rotation, lens changes).

The post-processing method is based on the fact that, during the reconstruction of a new view from another view and its impaired depth map, the depth map, as described further, undergoes some transformation (for example projection), making it easier to detect problematic values than when using the original decoded map.

First, given the fact that there is a correspondence (projective geometry) between depth and disparity, we work on the disparity map. Since it is always possible to have disparity vectors that are all along the same direction—by rectification of the original stereo pair according to epipolar constraints for example, well-known to those skilled in the art and described in the document "O. Faugeras, Three-dimensional computer vision, MIT Press, 1993", we will illustrate the method with the horizontal disparity vectors (the common case of a "parallel stereo setting" of video cameras). Of course, this should be in no way restrictive. In this case, disparity vectors are defined by a single value. Therefore, we will further refer to them as "disparity values".

In what will follow, $I_O$ will be the original texture image and IN the new reconstructed view. d will be the disparity map and d(x,y) will be the disparity value at pixel (x,y). The fact that the new view lies on the left side or on the right side of the original view and with a certain baseline (more or less far from the original view) is expressed by the a coefficient. For each pixel (x,y) of a view, we have the following relation:

$$I_O(x,y)=I_N(x+\alpha.d(x,y),y)$$

The reconstruction process can be done in several ways, a common one of which (as described in the document "Disparity field and depth map coding for multi-view 3D image generation, by D. Tzovaras, N. Grammalidis, G. Strinzis, *Signal Processing:Image Communication* 11 (1998) pages 205–230)), can be divided into the following main steps that will be detailed hereinafter:

1. Generation of the Projected Disparity Map
2. Projected disparity map Hole-filling
3. Final $I_N$ view generation based on the hole-filled Projected Disparity Map Based on the reconstruction process, the post-processing of a point of view is done as follows and is illustrated by FIG. 1.

In a first step 1), a projected disparity map is generated from the original disparity map of a point of view. N pixels of a view are projected on one pixel of the future view. N can take any value:

0, if no pixel is projected, in which case the corresponding pixel of the reconstructed view lies in the part of the new view that was occluded from the original one (occlusion area), 1 if only one pixel is projected to this pixel, or more, meaning that some pixels of the original view have disparity values that project them to the same pixel in the reconstructed view.

Thus, a list of disparity values corresponds to this pixel of the future view. The set of the lists corresponding to every pixel of the reconstructed view is the projected disparity map.

The main idea is that with the projection process being continuous, the projected disparity map should have more or less the same regularity as the original one. It also means that, if the original disparity map has some irregularities, the projected disparity map will have the same irregularities.

Figure 2:
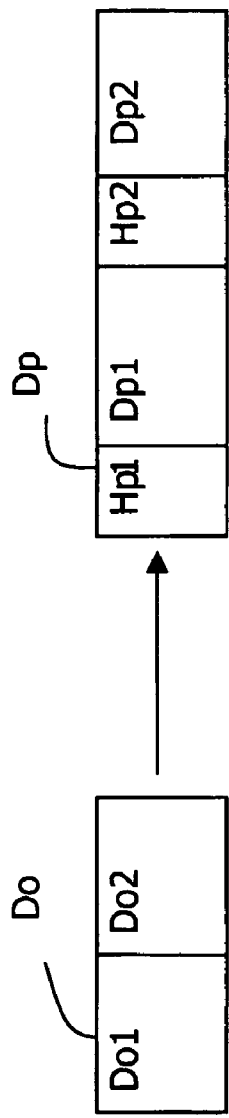
FIG. 2 depicts some holes in a projected disparity map, holes generated by the first step of the method for post-processing a video signal of FIG. 1.

If we consider the number of points projected at each pixel, there should also be some kind of regularity. In particular, in the middle of holes, there should not be isolated projected pixels. However, due to the DCT quantization process used to encode the disparity map, some pixel values are changed, and once projected, they are no longer close to their originally surrounding pixels. Such pixels are called isolated projected pixels. As we can see in FIG. 2, there is an original disparity map Do, which has two areas of pixels with the same values do1 and do2. The projected disparity map Dp has two corresponding areas of pixels dp1, dp2, but with areas Hp1, Hp2 of "hole".

Due to some compression artefacts, some pixels could be erroneously projected on these holes areas. They are called isolated pixels.

The method for post-processing removes those isolated projected pixels by using a first filtering F1. In a first non-limitative embodiment, the filtering is performed as follows. For each pixel Pp of the projected disparity map Dp, the number of surrounding pixels Pps defined as holes is counted (the notion of "surrounding pixel" is application dependent: it may be a square neighborhood centered on the pixel, a circular, rectangular one . . . ). If this number goes beyond a certain threshold T1, for example more than half the number of pixels contained in the neighborhood, the considered isolated pixel is set as "hole" and any pixel of the original disparity map leading to this pixel is marked as "wrong disparity value".

Figure 3:
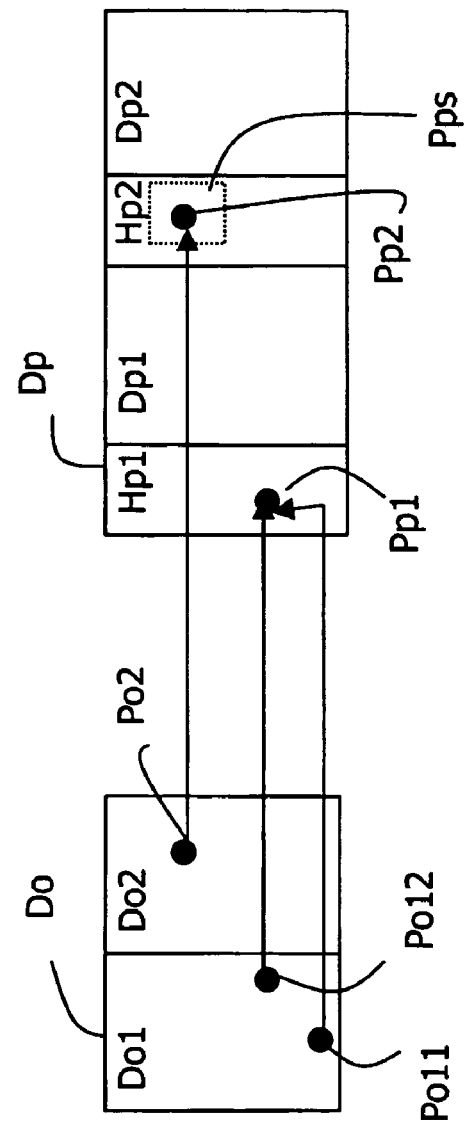
FIG. 3 depicts the filtering of holes in the projected disparity map during a first step of the method for post-processing a video signal of FIG. 1.

This first embodiment is depicted in FIG. 3. A first wrong pixel Po2 of the original disparity map Do has a corresponding isolated projected pixel Pp2 on the area Dp2 of the projected disparity map Dp. A second Po11 and a third Po12 pixel of the original disparity map Do has the same corresponding isolated projected pixel Pp1 on the area Dp1 of the projected disparity map Dp. The window in dotted line defines the surrounding pixels Pps of Pp2, here defined as holes, which makes Pp2 an isolated pixel. The same holds for Pp1. As a result, pixels of the original disparity map Do corresponding to Pp1 and Pp2 and Po11 and Po12, and Po2, respectively, are set as "wrong value".

It should be noted that such a filtering is well suited to the expected effects of the quantization on the disparity map, said quantization being one step of the compression and being one of the causes of the artefacts in the disparity map. Note that disparity quantization errors will mainly occur on sharp edges of the disparity map, where there are two widely different grey level homogeneous areas separated by a straight line (mainly at object boundary). These very same areas are the ones that generate large holes in the projected disparity map, suitable to pinpoint the isolated "Wrong Disparity Values".

In a second non-limitative embodiment, the filtering is done as follows. It is also possible to detect erroneous values by checking other isolated pixels of the projected map, as far as the number of projected pixel values is concerned. The isolated projected pixels are those that have no coherent characteristics with the ones of their surrounding pixels.

For instance, if a pixel containing 3 values is surrounded by pixels containing 2 values, it is likely to contain at least one false value. By comparing this set of values with its neighbouring ones, the wrong value in the list can be detected.

Note that, the number of values of a pixel of the projected disparity map ranges between 0 and n (n depends on the original disparity map). The required precision in isolated pixels detection will determine which kind of isolated pixel one wants to process: the isolated pixels surrounded by holes, then the ones having two or more values, and which are surrounded by pixels containing only one value, and so on. The more cases ones deals with, the more precise the disparity map but also the more computer-intensive the algorithm. This trade-off between precision and efficiency should depend on the kind of application wanted.

A way of improving this filtering process is by testing different values for the coefficient α: by doing so, one can detect more false values. There are two different ways of changing the coefficient α:

By changing its sign, that is changing the projection direction: this way both sides of objects within a view can be enhanced. For example, if a view contains a mountain and if one makes a "right" projection, one will filter the holes to the right of said mountain, and one will filter the holes to the left of the mountain for the "left" projection.

By changing its magnitude, one can accentuate disparity impairments and detect some of them that were not visible enough with a smaller magnitude, taking advantage of larger holes.

Note that running the filter for different values of a will improve detection efficiency but will increase complexity. The selection of the number of values to be tested is again application dependent.

In a second step 2), there is a filling of the holes of the projected disparity map.

During the reconstruction process, the second step, following projected disparity map generation, consists in filling the holes of this disparity map through interpolation. In general, the interpolation type is selected by considering that, in the final reconstructed view, the holes correspond to something belonging to the background rather than to the foreground object (which is the most common case in "real life"). An example is given below. In the projected disparity domain, we repeat the hole-boundary disparity value over the entire line of the hole, through a padding process. The padding process consists in taking the boundary disparity value, which is the nearest of the hole and pads the entire line of said hole with it.

In any case, interpolation strongly depends on hole boundary disparity values. The problem when using compressed (i.e. impaired) disparity maps is that the hole boundary values used for this padding process might be significantly changed by the compression algorithm and therefore might be erroneous, moreover in a way that varies from one line to the other: then, the padding process is performed on the basis of these erroneous values, which are propagated over the entire line in the hole. Visually, it can create what we call "worn edges" in the reconstructed view.

According to the method of the invention, a new specific post-processing filter F2 for hole boundary values is applied, which avoids the problems stated above. It applies to the boundaries of a hole and not the hole itself.

First, given the fact that some holes are not large enough to induce noticeably wrong interpolated values (for example, one-pixel wide holes), filtering is performed only at boundaries of holes that are larger than a given (application-dependent) threshold T2, for example, 3 pixels.

Figure 4:
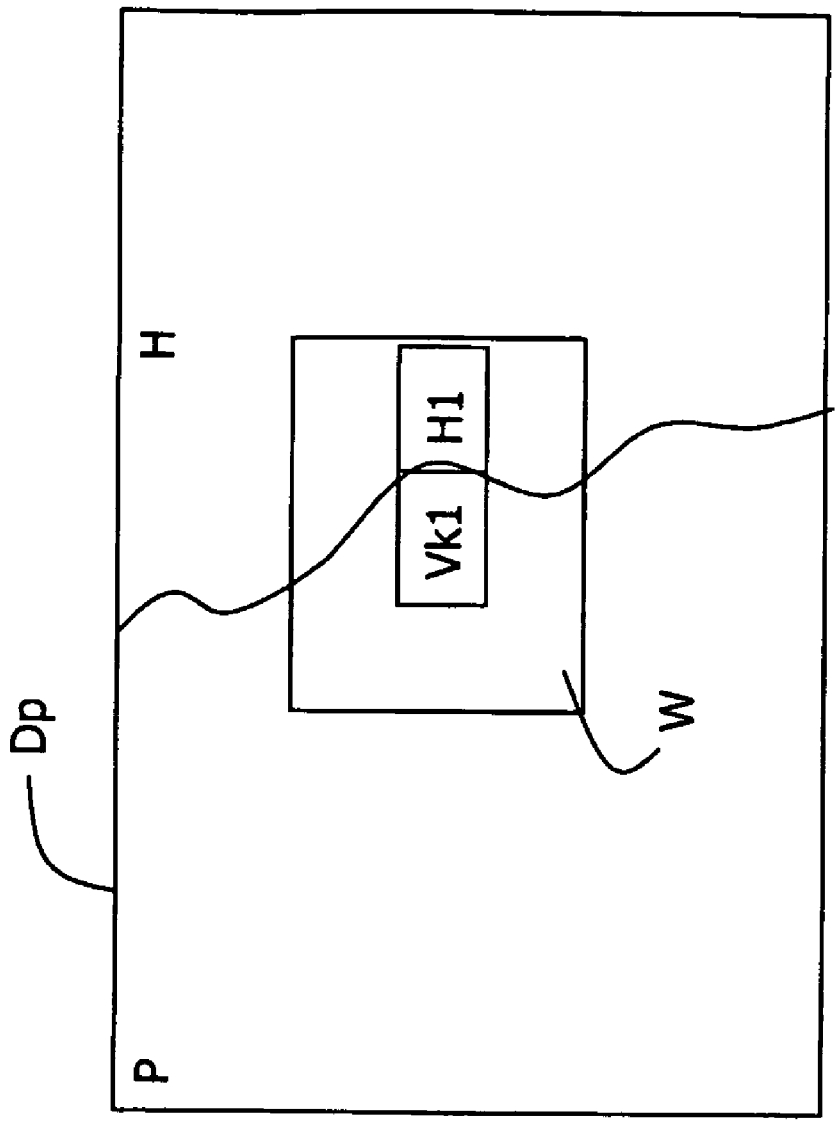
FIG. 4 illustrates the filling of holes in the projected disparity map during a second step of the method for post-processing a video signal of FIG. 1.

Then, for these selected holes H, median filtering is performed on boundary pixel values, taking into account the surrounding projected pixels values (excluding holes of course), as shown in FIG. 4.

In the example of FIG. 4, the projected disparity map Dp comprises two areas; one filed with pixels P and the other with holes H.

The hole H1 is selected in the projected disparity map Dp. A window W of pixel values (which are not holes) is taken around the boundary pixel value Vk1 of the considered hole H1. Once all the pixel values within the window W are sorted, the median value is taken and replaces the boundary pixel value Vk1.

After the pixel value Vk1 has been changed through the median filtering, the regular padding process is performed on the hole H1 itself with the new pixel value Vk1.

If this median filtering induces a change in boundary pixel value, the original disparity map boundary pixel value is marked as wrong value accordingly, and the pixel of the original disparity map that, if assigned the new value Vk1, would have been projected to the boundary pixel of the hole H1, is assigned the new value Vk1. These modifications can also be done when using different values for α (when changing its sign or magnitude as described above).

For example, a boundary pixel of a selected hole in the projected disparity map Dp is the pixel number 11 with a value 10. The corresponding pixel in the original disparity map D0 is a pixel number 1 with the value 10. After median filtering of the boundary pixel number 11, its new value is 5. Hence, the corresponding pixel number 1 in the original disparity map Do takes the value "wrong". Furthermore, the pixel of the original disparity map Do that, if assigned the new value 5, would have been projected to the boundary pixel number 11, is assigned the new value 5. Practically, the pixel number 6 in the original disparity map Do is assigned the value 5.

In a third step 3), final regularization is preferably performed. It consists in regularization of the projected disparity map by a median filtering F3 over the lines (this enables the projected disparity to be more regular and to smooth the irregularities that could not be detected by the previous filtering, for example because they were not located in the vicinity of big disparity discontinuities). As before, possible changes are translated to the original disparity map.

In a fourth step 4), final $I_N$ view generation based on the hole-filled projected disparity map is performed.

The different processing steps described above have been performed in the projected disparity domain. Therefore, in a first non-limitative embodiment, the final reconstructed view R_VIEW can be generated from this filtered projected disparity map as is well known to the person skilled in the art as described in the document "Disparity field and depth map coding for multi-view 3D image generation, by D.

Tzovaras, N. Grammalidis, G. Strinzis, *Signal Processing: Image Communication* 11 (1998) pages 205–230".

In a second non-limitative embodiment, the reconstructed view is generated from a modified version of the original disparity map as described below.

Note that during the various filtering processes in steps 1 and 2, whenever a pixel is modified or labeled as "Wrong Disparity Value" in the projected disparity map, the original disparity map is marked and modified as well as described in the foregoing. These modified or labeled pixels are thus translated to the original disparity map.

A list of undefined values WV or "Wrong Disparity Value" is then obtained.

This list should be replaced during a "hole filling" procedure in order to get the final enhanced disparity map. The more reliable procedure to do so is the following.

The original decoded disparity map with the undefined values, i.e. the modified original disparity map, is scanned over the lines. To fill the undefined values, one of the boundary pixel values of the undefined values is copied: in general, there are two possible boundary pixel value candidates to choose from, one on the left and one on the right of the pixel containing the undefined value. One choice would be to use a bilinear or nearest neighbor interpolation, but the variable size of the holes could make the interpolation inconsistent in space. Hence, the boundary pixel that has the closest value to the original pixel in the original decoded disparity map is preferably chosen. Although compression might change the original uncompressed value quite a bit, the final value is generally closer to the surrounding pixels of the same object and the post-processed disparity map obtained is close to the original uncompressed one (experimental results were better with this kind of interpolation).

Figure 5:
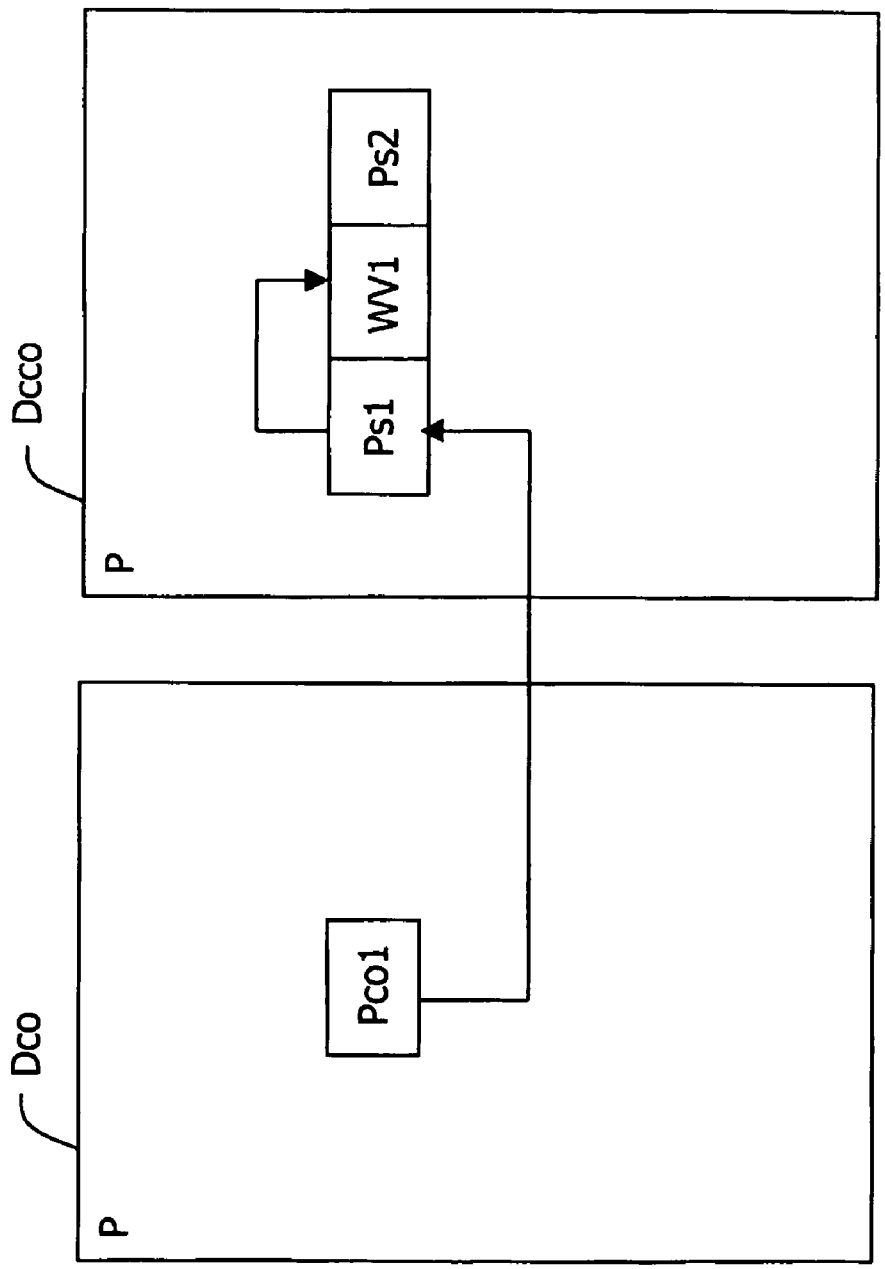
FIG. 5 illustrates the filtering of undefined pixel values during the third step of the method for post-processing a video signal of FIG. 1.

As illustrated in FIG. 5, one can see the original decoded disparity map Dco and the modified original decoded disparity map Dcco with the undefined values. In the latter disparity map Dcco, one can see one undefined value WV1 that has to be corrected. It corresponds to a pixel Pco1 in the original decoded disparity map Dco. There are two boundary pixel candidates Ps1 and Ps2 for the undefined value WV1. Ps1 is the pixel that has the nearest value from the corresponding original pixel Pco1 of the original decoded disparity map Dco. Said pixel Ps1 replaces the undefined value WV1.

Once the interpolation is done, a corrected disparity map close to the original uncompressed disparity map has been generated. The advantage of creating such a map is two-fold:
It can be used again for the view reconstruction process. As artefacts have been removed from this corrected disparity map, it can be used for a final reconstruction (with no need of a further filtering, except perhaps Regularization step 3). It gives a better reconstruction view than with the projected disparity map.
The generated corrected map is generally much sharper, and with no aberrant values, which makes it much more suitable for other applications based on depth/disparity values such as compositing and Z-keying well known to those skilled in the art.

It is to be understood that the present invention is not limited to the aforementioned embodiments and variations and modifications may be made without departing from the spirit and scope of the invention as defined in the appended claims. In the respect, the following closing remarks are made.

It is to be understood that the present invention is not limited to the aforementioned video application. It can be used within any application using a system for processing a signal taking compressed disparity maps into account. In particular, the invention applies to video compression algorithms of the other MPEG standard family (MPEG-1, MPEG-2) and to the ITU H26X family (H261, H263 and extensions, H261 being the latest today, reference number Q15-K-59) if applied to disparity map coding.

It is to be understood that the method according to the present invention is not limited to the aforementioned implementation.

There are numerous ways of implementing functions of the method according to the invention by means of items of hardware or software, or both, provided that a single item of hardware or software can carry out several functions. It does not exclude that an assembly of items of hardware or software or both carries out a function, thus forming a single function without modifying the method for post-processing the video signal in accordance with the invention.

Said hardware or software items can be implemented in several manners, such as by means of wired electronic circuits or by means of an integrated circuit that is suitably programmed. The integrated circuit can be contained in a computer or in a decoder. In the latter case, the decoder comprises means for performing steps 1, 2, 3 and 4 of the method for post-processing a video signal, as described previously, said means being hardware or software items as stated above.

The integrated circuit comprises a set of instructions. Thus, said set of instructions contained, for example, in a computer programming memory or in a decoder memory may cause the computer or the decoder to carry out the different steps of the post-processing method.

The set of instructions may be loaded into the programming memory by reading a data carrier such as, for example, a disk. A service provider can also make the set of instructions available via a communication network such as, for example, the Internet.

Any reference sign in the following claims should not be construed as limiting the claim. It will be obvious that the use of the verb "to comprise" and its conjugations does not exclude the presence of steps or elements other than those defined in any claim. The article "a" or "an" preceding an element or step does not exclude the presence of a plurality of such elements or steps.

The invention claimed is:

1. A method for post-processing a digital video signal, said digital video signal, said digital video signal having a plurality of views with associated disparity maps, and said digital video signal having been subjected to an encoding process including a compression and a corresponding decoding process which impairs the associated disparity maps, characterized in that said method comprises the steps of:
  generating a projected disparity map from an impaired disparity map; and
  filling holes within said projected disparity map, wherein the generating step comprises the sub-step of removing isolated projected pixels on said projected disparity map by filtering.

2. The method for post-processing a digital video signal as claimed in claim 1, characterized in that the filtering is performed by selection of isolated projected pixels that are surrounded by holes.

3. The method for post-processing a digital video signal as claimed in claim 1, characterized in that the filtering is performed by selection of isolated projected pixels, which have no coherent characteristics with the ones of surrounding pixels.

4. The method for post-processing a digital video signal as claimed in claim 2 or 3, characterized in that the filtering applies to both projection directions of the projected disparity map.

5. The method for post-processing a digital video signal as claimed in claim 2 or 3, characterized in that the filtering comprises a sub-step of changing the disparity map projection magnitude.

6. The method for post-processing a digital video signal as claimed in claim 1 or 2, characterized in that the selected isolated projected pixels are set as hole and the corresponding pixels in the original disparity map leading to these selected projected pixels are marked as wrong, thus leading to a modified original disparity map.

7. The method for post-processing a digital video signal as claimed in claim 1 or 2, characterized in that the filling step comprises the sub-steps of:
  selecting a hole that is larger than a threshold (T2),
  median filtering on a selected boundary pixel value of said selected hole, taking into account the surrounding projected pixel values of said hole boundary pixel value, and
  padding the hole with the result of said median filtering.

8. The method for post-processing a digital video signal as claimed in claim 7, characterized in that when the selected boundary pixel gets a new value from the median filtering, the corresponding pixel in the original disparity map leading to said selected boundary pixel is marked as wrong and the pixel in the original disparity map corresponding to the boundary pixel with the new value is assigned said new value, thus leading to a modified original disparity map.

9. The method for post-processing a digital video signal as claimed in claim 6, characterized in that said method further comprises the step of:
  filling the wrong pixels of the modified original disparity map with one of their boundary pixel values that have the closest value to the original pixels of the original disparity map.

10. The method for post-processing a digital video signal as claimed in claim 9, characterized in that the reconstructed view is reconstructed from the modified original disparity map.

11. A computer program product for a decoder, comprising a set of instructions, which, when loaded into said decoder, causes the decoder to carry out the method as claimed in claim 1.

12. A computer program product for a computer, comprising a set of instructions, which, when loaded into said computer, causes the computer to carry out the method as claimed in claim 1.

* * * * *